P. C. HEWITT.
METHOD OF REPRODUCING VARIATIONS IN AN ELECTRIC CIRCUIT.
APPLICATION FILED NOV. 19, 1915. RENEWED NOV. 12, 1921.
1,402,932.
Patented Jan. 10, 1922.
2 SHEETS—SHEET 1.
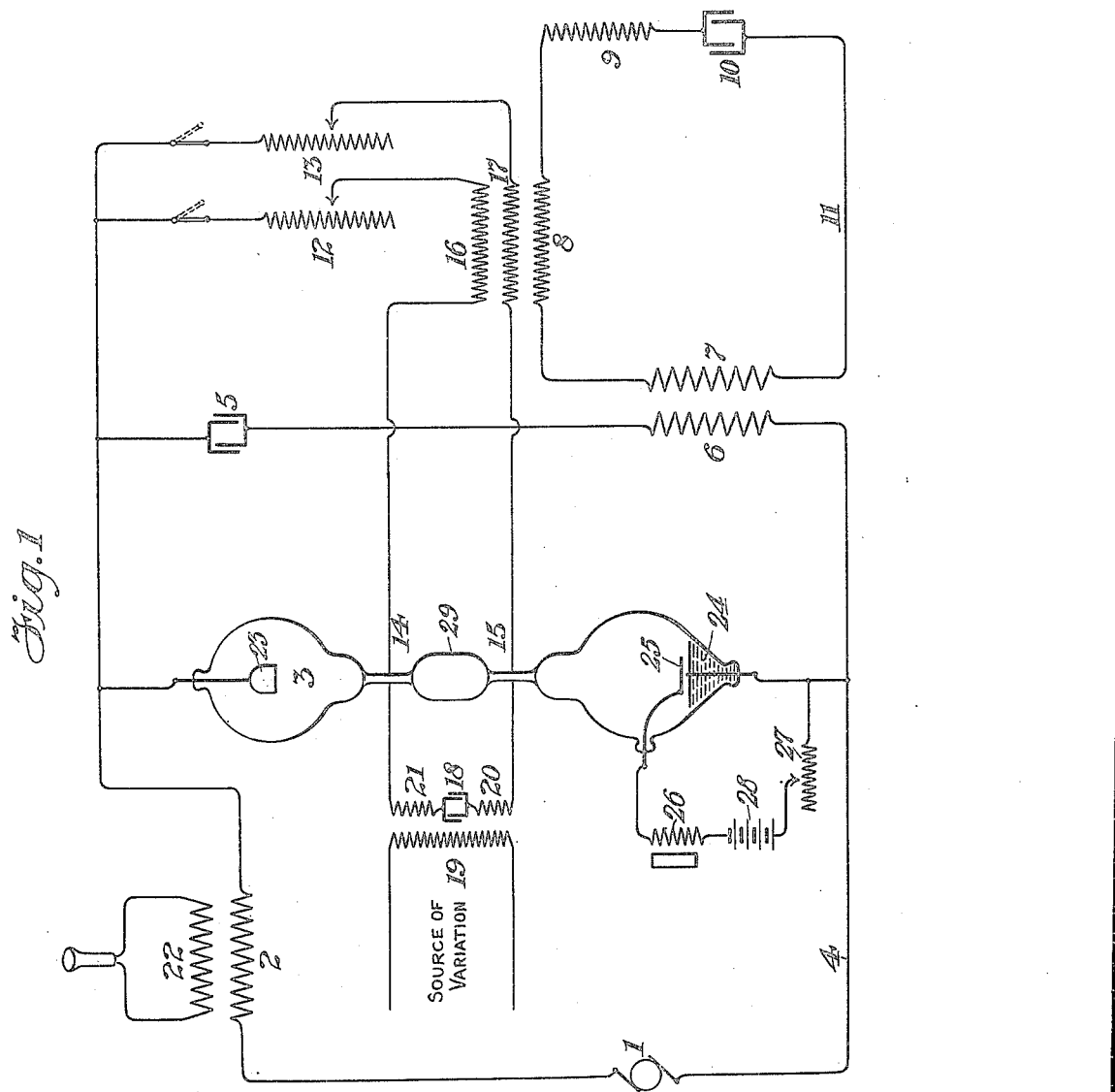

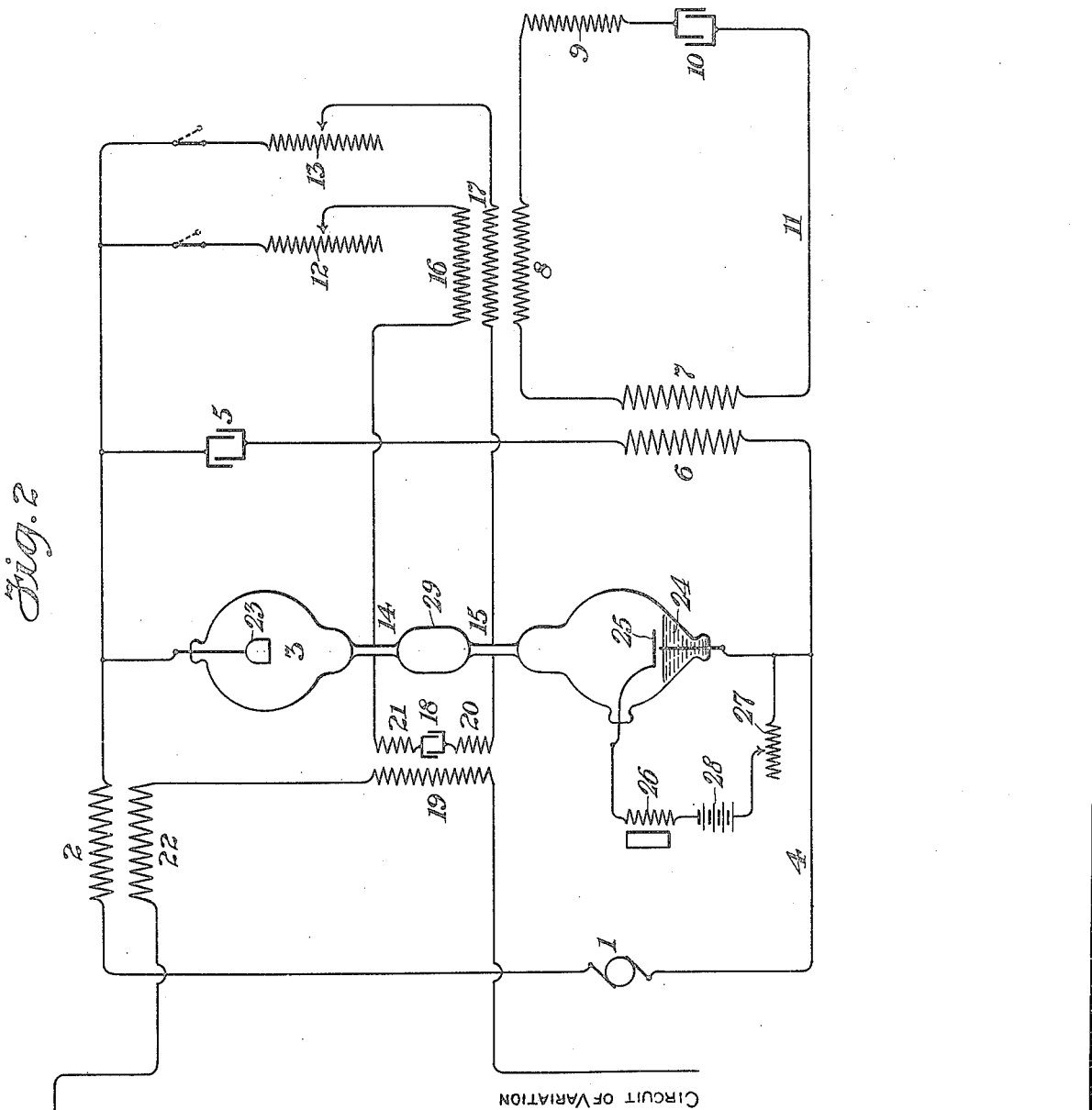

UNITED STATES PATENT OFFICE.

PETER COOPER HEWITT, OF RINGWOOD MANOR, NEW JERSEY.

METHOD OF REPRODUCING VARIATIONS IN AN ELECTRIC CIRCUIT.

1,402,932. Specification of Letters Patent. Patented Jan. 10, 1922.

Application filed November 19, 1915, Serial No. 62,385. Renewed November 12, 1921. Serial No. 514,825.

*To all whom it may concern:*

Be it known that I, PETER COOPER HEWITT, a citizen of the United States, and resident of Ringwood Manor, county, of Passaic, State of New Jersey, have invented certain new and useful Improvements in Methods of Reproducing Variations in an Electric Circuit, of which the following is a specification.

My invention relates to the reproduction of electrical variations in an electrical circuit, from a source of variations, with increased, decreased, or the same, value by means of the control of the amount of electrical energy supplied from the source by the circuit. It consists of a supply of electrical energy and circuits therefor, a consumption circuit and means for limiting and governing the amount of energy from the source by means of variations affecting the circuit associated with a free circuit and means for utilizing the variations of energy in the supply through the instrumentality of the consumption circuit.

The invention also consists in causing the energy delivered to the free circuit to assist in limiting and governing the amount of energy delivered.

I have illustrated my invention in the accompanying drawings, in which Figure 1 shows diagrammatically the general organization of the system forming the subject of the present invention; and Fig. 2 shows a modification.

Figure 1 shows a source, 1, of direct current included in a circuit which contains an inductance, 2, and a gas or vapor tube, 3. A tube such as the tube 3 is called by me in my application for Letters Patent number 15,267, filed March 18, 1915, a "pulsator". The line 4 completes the circuit to the source. The "pulsator" described in said application and shown in the drawings hereof consists of an exhausted vacuum, gas, or vapor tube having a positive electrode, 23, in a glass chamber connected to another chamber containing a negative electrode, 24, and, in this instance, made up of a pool of mercury with a keep-alive positive electrode 25, in operative relation thereto, and inductance 26, resistance 27, a direct current source, 28, and suitable connections to the keep-alive positive electrode and the mercury pool to complete the circuit. The two chambers just mentioned are connected by means of two connecting tubes of platinum, 14 and 15, insulated from each other by a glass bulb, 29. In shunt to the pulsator is a second circuit having a natural time period, and including a capacity, 5, and an inductance, 6. The inductance may be related inductively to an inductance, 7, included in a third or free circuit, 7—8—9—10—11. This circuit preferably has a natural time period, although such a time period is not necessary for all uses. The pulses of the pulsator are controlled by an electrical connection containing resistance, 12, 13, from the positive electrode to the control connections of the pulsator, 14, 15, connecting with the vapor path between the electrodes, and these connections may include coils, 16, 17, inductively associated with the inductance 8 of the free circuit for assisting in the control of the pulsator and promoting the regularity of its action.

The circuit receiving the electrical variations to be reproduced, magnified or diminished, or otherwise modified, is caused to include the control connections of the pulsator, 14, 15, and also a condenser, 18, for preventing the direct current flow, but permitting the transmission of electrical variations from inductance, 19, by means of inductances, 20, 21, for affecting the conducting vapor forming part of the circuit through the pulsator.

The pulsator, being affected by electrical variations, will, in turn, cause variations in the current supplied from the source. The variations in the supply circuit may be caused to affect another circuit, herein referred to as the work or consumption circuit, by means of the inductance 2 in the supply circuit being in inductive relation to inductance 22 in the work circuit. The variations in the work circuit may be utilized in any manner desired. The work circuit is here shown as a telephone circuit for which any suitable form of work circuit may be substituted.

Figure 2 shows an arrangement similar to that of Figure 1, except that the circuit serving as the source of variations is also caused to be the work circuit, the inductance 22 being included in the circuit of the source of variation.

In Figure 1, the variations from the source of variation, 19, are reproduced in the work circuit, either amplified or not, as may be desired. In Figure 2, the variations from the source of variation and the variations produced by the device react one on the other to produce still further amplified or diminished variations, depending on the arrangement and adjustment of the different parts of the circuit. The invention may be utilized according to my application Serial No. 775,632, filed June 25th, 1913.

A preliminary step in the operation of the system is to put the negative electrode at one end of the tube, 3, in active condition and this is accomplished with the type of negative electrode here shown by shaking the tube to cause a make-and-break connection between the mercury pool, 24, and the keep-alive positive, 25, whereupon current flows continuously from the battery, 28, through the circuit 26, 25, 24 and 27. The system as a whole is then energized by the current flowing from the source 1 and a charge is built up in the condenser, 5. When the charge in the said condenser has reached a value sufficient to overcome the resistance to starting of the current path between the electrodes 23 and 24, which resistance is determined by the tubes 14 and 15 and the resistances 12 and 13 connected therewith, the condenser 5 discharges through the tube 3 by way of the electrode 23, tubes 14 and 15, electrode 24 and coil, 6. When the condenser 5 has discharged itself the current from the source again passes to it and the flow of current through the tube ceases. The starting resistance of the current path between the electrodes 23 and 24 is then re-established at the tubes 14 and 15. Another discharge from the condenser through the tube takes place when the condenser has attained a charge sufficient to overcome the starting resistance of the said current path. The frequency of the intermittent current through the tube 3 is determined, other things being equal, by the potential charge on the conductors 14 and 15 which is regulated by the adjustable resistances 12 and 13 in circuit therewith. The varying currents of the capacity circuit 5 are prevented from flowing in the circuit of the source 1 by the inductance 2 in the supply line, this inductance being of a sufficiently high value to maintain practically constant current in the supply line. The operation of the system thus far described is that of the pulsator system described and claimed in my application Serial Number 15,267, filed March 18th, 1915, referred to above.

When desired, the free oscillating circuit 7, 8, 9, 10 and 11 is coupled with the inductance 6 of the capacity circuit and with inductances 16 and 17 of the control circuits of the tubes 14 and 15 and functions as a balancing device for the system. The transfer of energy to the free oscillating circuit through the inductive couple, 6, 7, serves as a means of dissipating in the resistance, 9, the energy received by the circuit and also through the inductive action of coils 16, 17 and 8 provides additional means of controlling the characteristics of the vapor path through the tubes 14 and 15.

Electrical variations are impressed on the tubes 14 and 15 through the medium of the transformer 19, 20, 21, and vary the starting resistance of the current path through the tube, which in turn varies the frequency of the intermittent current flow therethrough. The variations of the frequency vary the energy delivered by the source 1 to the tube 3 and these variations are reproduced in the coil 2 in the main line and are taken off and utilized in a suitable work circuit, as coil, 22.

Where sound variations are to be modified or transmitted, the natural time period of the circuit 5—6, Figure 1, should be above audibility in connection with the instruments used.

By way of example, it may be assumed that the circuit of variation in Figure 2 is a telephone line. The effects of the variations produced by the operation of the telephone are reproduced in the inductances 19 and 22. The action of the inductance 19 is the same as that already described in connection with the same inductance shown in Figure 1. Through the action of said inductance in combination with the other devices in the system and their relation to each other, the variations are reproduced or modified in the inductance 2, and being so reproduced or modified exercise an effect upon the inductance 22 and indirectly upon the inductance 19, whereby the entire telephone line is affected. At any desired point in said line, as at a local station, the variation in the line may be heard by means of a telephone and accordingly the telephone line becomes, in this instance, the work circuit corresponding in a general way to the work circuit 22 in Figure 1.

I claim as my invention:

1. The method of reproducing electrical variations in an electrical circuit, which consists in supplying energy to said circuit, generating intermittent current from said supply of energy in a portion of the circuit, preventing the flow of the intermittent current in the supply portion of said circuit, varying the amount of energy delivered to the intermittently conducting portion of the circuit by impressing thereon variations to be reproduced, and utilizing the reproduced variations.

2. The method of reproducing electrical variations in an electrical circuit, which consists in supplying energy to said circuit, generating intermittent current from said supply of energy in a portion of the circuit, preventing the flow of the intermittent current in the supply portion of said circuit, varying the amount of energy delivered to the intermittently conducting portion of the circuit by impressing thereon variations to be reproduced, and utilizing the reproduced variations in the supply portion of the circuit.

3. The method of reproducing electrical variations in an electrical circuit, which consists in supplying energy to said circuit, producing intermittent current flow in a portion of said circuit, and controlling the frequency of the intermittent current by impressing electrical variations on the intermittently conducting portion of the circuit.

4. The method of reproducing electrical variations in an electrical circuit, which consists in supplying energy to said circuit, producing intermittent current flow in a portion of said circuit, and controlling the frequency of the intermittent current by the variations to be reproduced to vary the amount of energy delivered to a free oscillating circuit.

5. The method of reproducing electrical variations in an electrical circuit, which consists in supplying energy to said circuit, producing intermittent current flow in a portion of said circuit, varying the frequency of the intermittent current, thereby varying the amount of current supplied from the source, by impressing electrical variations on the intermittently conducting portion of the circuit, and in further varying the amount of energy supplied to the intermittently conducting portion of the circuit from the source by transferring a portion of said energy to an oscillating circuit of fixed time period.

6. The method of reproducing electrical variations in an electrical circuit, which consists in supplying energy to said circuit, producing intermittent current flow in a portion of said circuit, varying the frequency of the intermittent current, thereby varying the amount of current supplied from the source, by impressing electrical variations on the intermittently conducting portion of the circuit, and in further varying the amount of energy supplied to the intermittently conducting portion of the circuit from the source by transferring a portion of said energy to the source of impressed variations.

7. The method of reproducing electrical variations in an electrical circuit, which consists in supplying energy to said circuit, producing intermittent current flow in a portion of said circuit, varying the frequency of the intermittent current, thereby varying the amount of current supplied from the source, by impressing electrical variations on the intermittently conducting portion of the circuit, and in further varying the amount of energy supplied to the intermittently conducting portion of the circuit from the source by transferring portions of said energy to the oscillating circuit and to the source of impressed variations.

8. The method of reproducing electrical variations in an electrical circuit, which consists in supplying energy to said circuit, producing from said supply of energy an intermittent current flow in a portion of said circuit, and varying the current of the supply by impressing electrical variations on the intermittently conducting portion of the circuit.

9. The method of reproducing electrical variations in an electrical circuit, which consists in supplying said circuit with continuous current, producing from said continuous current an intermittent current flow in a portion of said circuit, and varying the current of the supply by impressing electrical variations on the intermittently conducting portion of the circuit.

10. In combination, a source of variation, a source of direct current, an intermittently conducting discharge device, a load in the line from the direct current source to the device, a capacity and an inductance in shunt to the discharge device, and connections from the source of variation to the said device.

11. In combination, a source of variation, a source of direct current, an intermittently conducting vapor discharge device, an inductance in the line from the direct current source to the device, a capacity and an inductance in shunt to the vapor discharge device, and connections from the source of variation to the said device.

12. In combination, a source of direct current, a source of variation, an intermittently conducting discharge device, an inductance in the line from the source to the device, a capacity and inductance in shunt to the discharge device, and connections from the source of variation to the discharge device, at least one of said connections being located between the electrodes of the device.

13. In combination, a source of direct current, a source of variation, an intermittently conducting discharge device, an inductance in the main line from the source of direct current to the device, and a work circuit inductively related to said inductance, a capacity and inductance in shunt to the discharge device, and connections from the source of variation to the device.

14. In combination, a source of direct current, a source of variation independent thereof, a discharge device, an inductance in the line from the source to the device, the said inductance being operatively related to a corresponding inductance in a work circuit, a condenser and inductance in shunt to the discharge device, connections from the source of variation to the discharge device and a free oscillating circuit having an 15. In combination, a source of direct current an intermittently conducting discharge device, an inductance in the main line from the direct current source to the device, a capacity and an inductance in shunt to the discharge device, and connections from the source of variation to a portion of the circuit of the discharge device.

16. In combination, a source of direct current, a vapor discharge device, an inductance in the line from the direct current source to the device, a capacity and an inductance in shunt to the vapor discharge device, and connections from the source of variation to a limited portion of the vapor path of the discharge device.

17. In combination, a source of direct current, a discharge device, an inductance in the line from the source to the device, a source of variation and another inductance in the circuit thereof co-operating with the inductance in the line, a capacity and another inductance in a shunt to the discharge device, and connections from the source of variation to the discharge device.

18. In combination, a source of direct current, a discharge device, an inductance in the line from the source to the device, a source of variation and another inductance in the circuit thereof co-operating with the inductance in the line, a capacity and another inductance in the shunt to the discharge device, and connections from the source of variation to a limited portion of the discharge device.

19. In combination, a source of direct current, an intermittently conducting discharge device, an inductance in the line from the source to the device, a source of variation and another inductance in the circuit thereof co-operating with the inductance in the line, and means for reproducing the variations of the source of variation in the first named inductance and causing the same to act upon the second inductance in the circuit of the source of variation.

20. In combination, a source of direct current, a discharge device, an inductance in the line from the source to the device, a source of variation and another inductance in the circuit thereof cooperating with the inductance in the line, and means for reproducing the variations of the source of variation in the first named inductance and causing the same to act upon the second inductance in the circuit of the source of variation and preventing the variations produced from affecting the source.

21. In combination, a source of direct current, a discharge device, an inductance in the line from the direct current source to the device, a second or separate inductance controlled by a capacity in the direct current circuit, and a free oscillatory circuit exposed to the inductive effects of the last named inductance and reacting upon the direct current flow in the main circuit.

22. In combination, a source of direct current, a discharge device, an inductance in the line from the direct current source to the device, a second or separate inductance controlled by a capacity in the direct current circuit, and a free oscillatory circuit exposed to the inductive effects of the last named inductance and reacting upon the direct current flow in the main circuit, the first named inductance being operatively related to an inductance in a work circuit.

23. In combination, a source of variation, a source of direct current, a discharge device having main electrodes, an inductance in the line from the direct current source to the device, a capacity and an inductance in shunt to the discharge device, a plurality of electrodes intermediate the main electrodes of the discharge device, and connections from the source of variations to said intermediate electrodes.

24. In combination, a source of direct current, an intermittently conducting discharge device, an inductance in the line from the direct current source to the device, a capacity and an inductance in shunt to the discharge device, and connections from the source of variation to a limited portion of the current path in the discharge device.

Signed at New York in the county of New York and State of New York this 18th day of November, A. D. 1915.

PETER COOPER HEWITT.

Witnesses:
R. A. HEWITT,
WALTER E. F. BRADLEY.